United States Patent
Takahashi et al.

(10) Patent No.: US 12,149,366 B2
(45) Date of Patent: Nov. 19, 2024

(54) COMMUNICATION DEVICE AND COMMUNICATION SYSTEM FOR RETRANSMISSION CONTROL

(71) Applicant: SONY SEMICONDUCTOR SOLUTIONS CORPORATION, Kanagawa (JP)

(72) Inventors: Hiroo Takahashi, Kanagawa (JP); Takayuki Hirama, Kanagawa (JP); Soichiro Miyazaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 17 days.

(21) Appl. No.: 17/906,724

(22) PCT Filed: Mar. 18, 2021

(86) PCT No.: PCT/JP2021/011204
§ 371 (c)(1),
(2) Date: Sep. 19, 2022

(87) PCT Pub. No.: WO2021/193374
PCT Pub. Date: Sep. 30, 2021

(65) Prior Publication Data
US 2023/0155750 A1    May 18, 2023

(30) Foreign Application Priority Data

Mar. 26, 2020    (JP) ................ 2020-056057

(51) Int. Cl.
*H04L 1/1867*    (2023.01)
(52) U.S. Cl.
CPC ................... *H04L 1/189* (2013.01)

(58) Field of Classification Search
CPC ..... H04L 1/189; H04L 1/1825; H04L 1/1854; H04L 1/1874; H04L 1/1887; H04L 65/40
See application file for complete search history.

(56) References Cited

U.S. PATENT DOCUMENTS

| | | | |
|---|---|---|---|
| 2003/0131300 A1* | 7/2003 | Park | H04L 65/612 714/776 |
| 2011/0022919 A1* | 1/2011 | Sahara | H04L 1/1825 714/E11.131 |

(Continued)

FOREIGN PATENT DOCUMENTS

| | | |
|---|---|---|
| JP | 56-66980 A | 6/1981 |
| JP | 2005-033424 A | 2/2005 |

(Continued)

OTHER PUBLICATIONS

Chun-Yi Chang and Hsu-Feng Hsiao, "Priority-base retransmission scheduling for Automatic Repeat Request over wireless networks," 2015 Seventh International Conference on Ubiquitous and Future Networks, Sapporo, 2015, pp. 350-354, (Year: 2015).*

(Continued)

*Primary Examiner* — Cynthia Britt
(74) *Attorney, Agent, or Firm* — CHIP LAW GROUP

(57) ABSTRACT

There is provided a communication device which includes a determination section that determines propriety of a retransmission request on a basis of priority specified for each area within a frame in retransmission control, and a transmission section that generates retransmission request data, and makes transmission to another communication device, in a case where the retransmission request is permitted in the determination section.

14 Claims, 15 Drawing Sheets

(56) References Cited

U.S. PATENT DOCUMENTS

| | | | | |
|---|---|---|---|---|
| 2018/0062793 A1* | 3/2018 | Ueno | ................... | H04L 69/324 |
| 2020/0229030 A1* | 7/2020 | Nguyen | ................ | H04W 24/08 |
| 2021/0250118 A1* | 8/2021 | Roth-Mandutz | ...... | H04W 72/56 |
| 2022/0078768 A1* | 3/2022 | El Hamss | ............. | H04L 5/0055 |
| 2022/0158783 A1* | 5/2022 | Matsumura | ........... | H04L 5/0055 |
| 2022/0216952 A1* | 7/2022 | Nishio | ................. | H04L 1/1864 |

FOREIGN PATENT DOCUMENTS

| | | |
|---|---|---|
| JP | 2010-056964 A | 3/2010 |
| JP | 2017-211864 A | 11/2017 |

OTHER PUBLICATIONS

International Search Report and Written Opinion of PCT Application No. PCT/JP2021/011204, issued on Jun. 22, 2021, 10 pages of ISRWO.

\* cited by examiner

[FIG. 1]
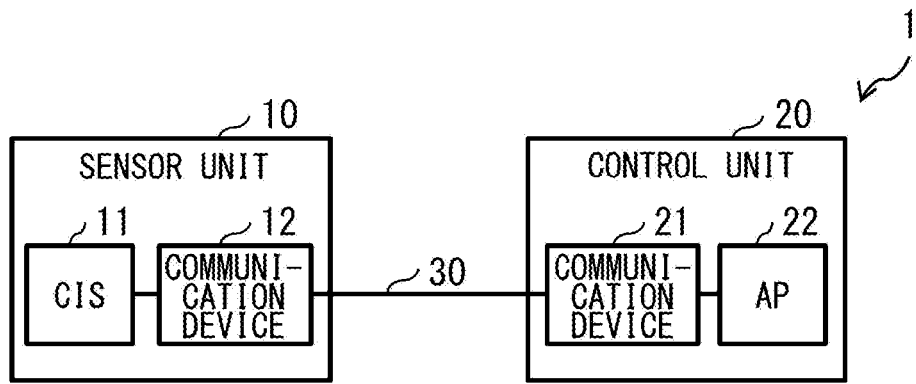
[FIG. 2]
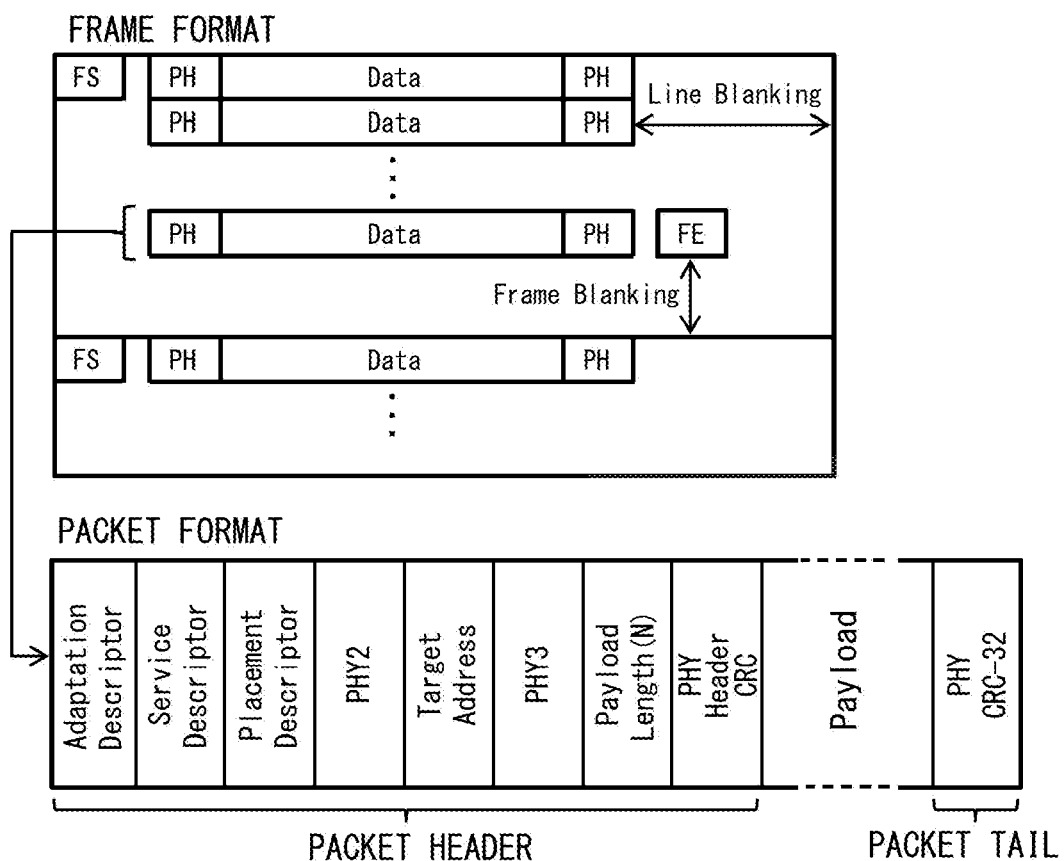

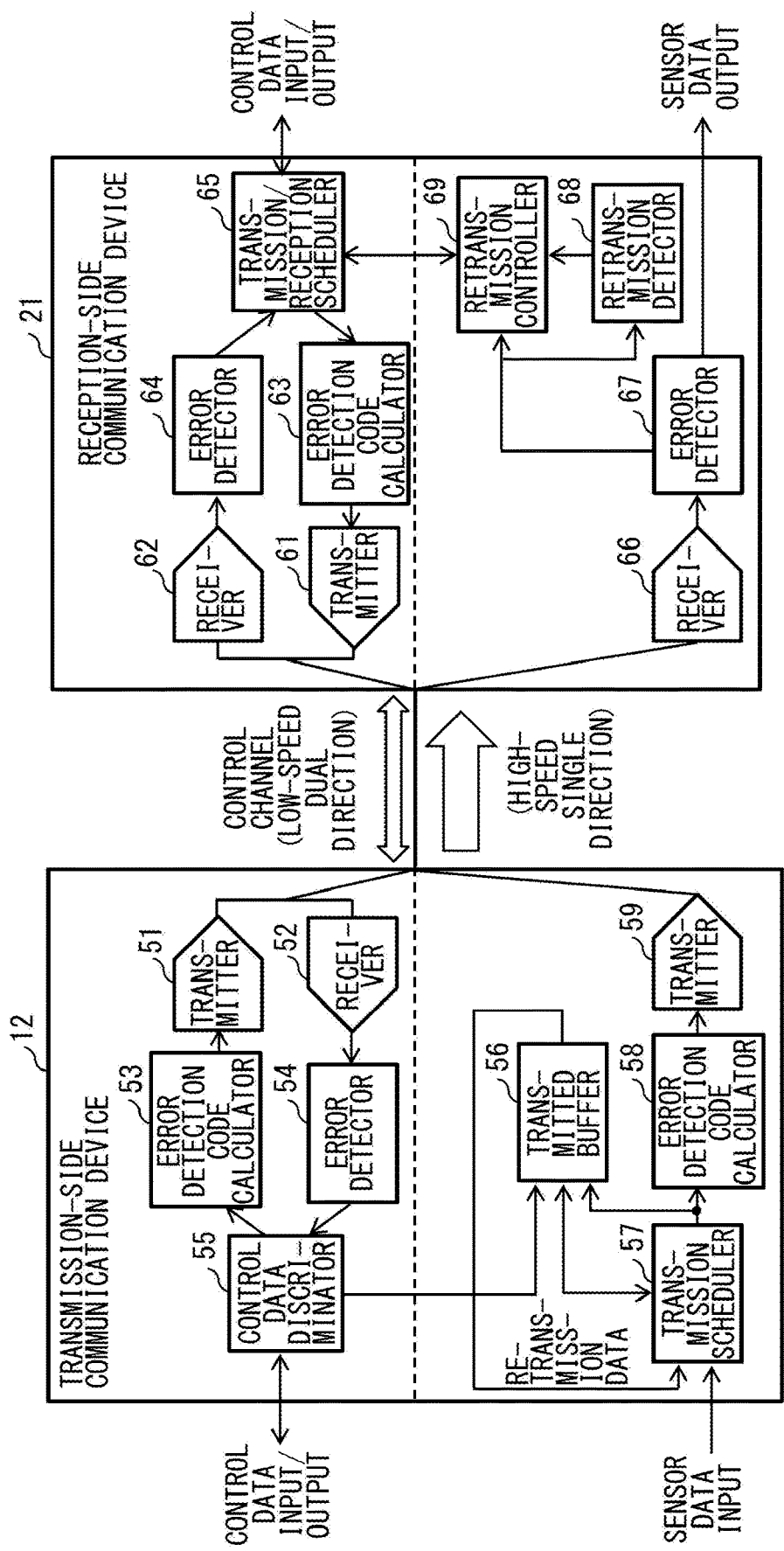

[FIG. 4]
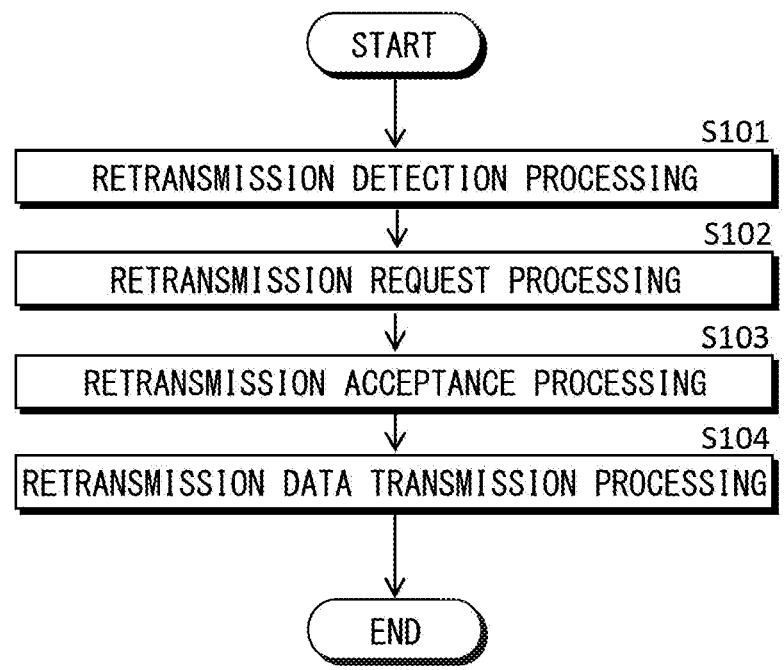

[FIG. 5]
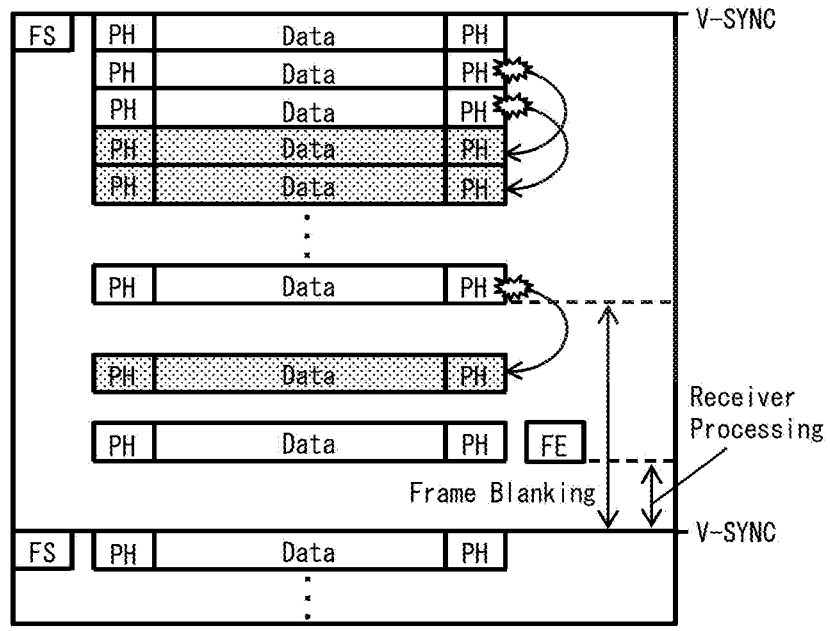
[FIG. 6]
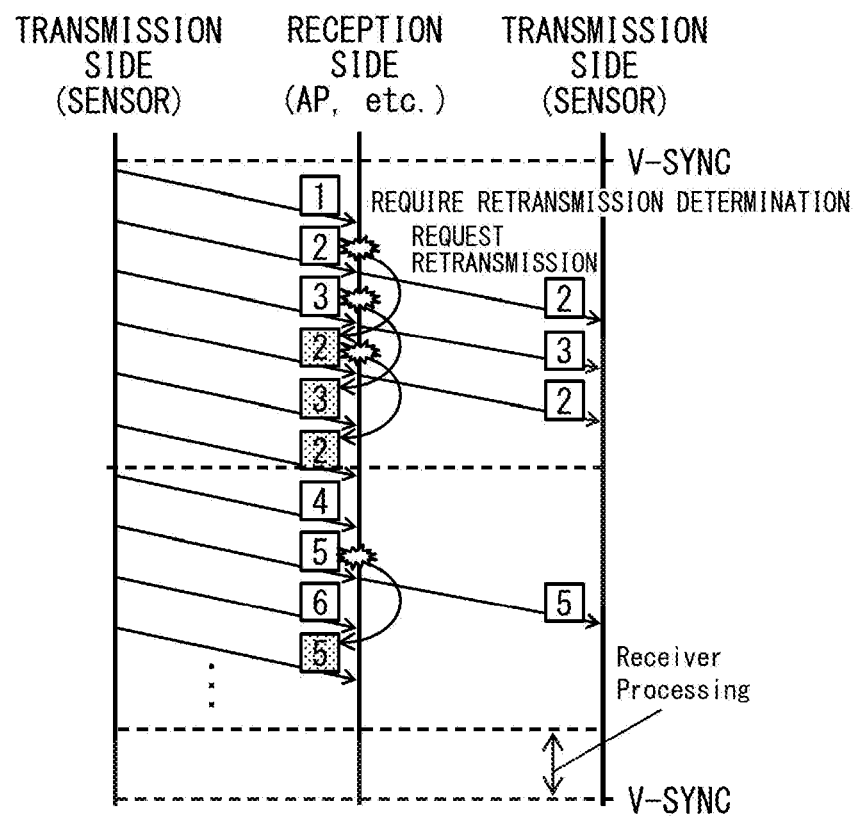

[FIG. 7]
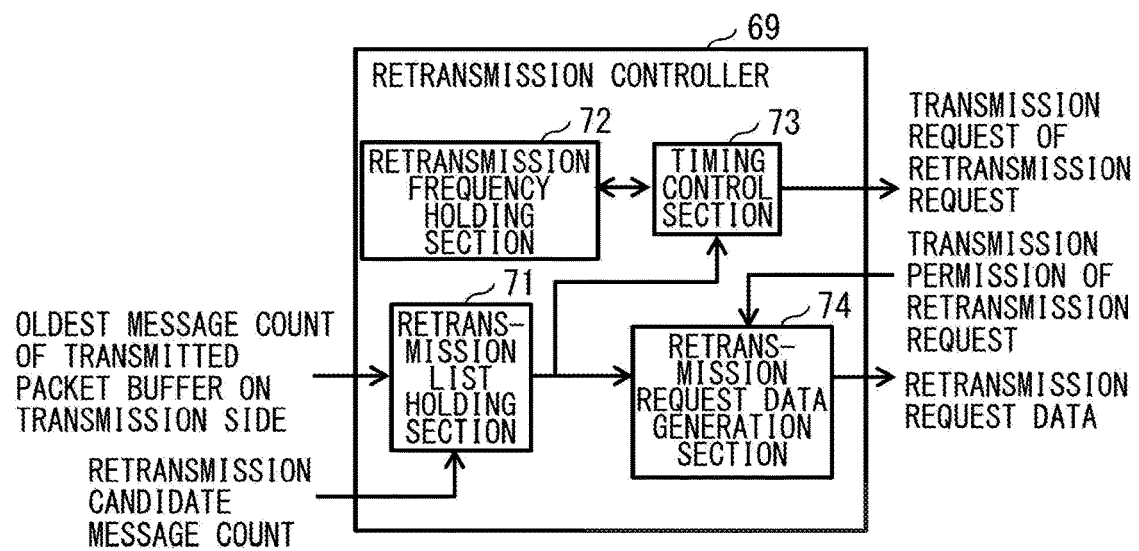

[FIG. 8]
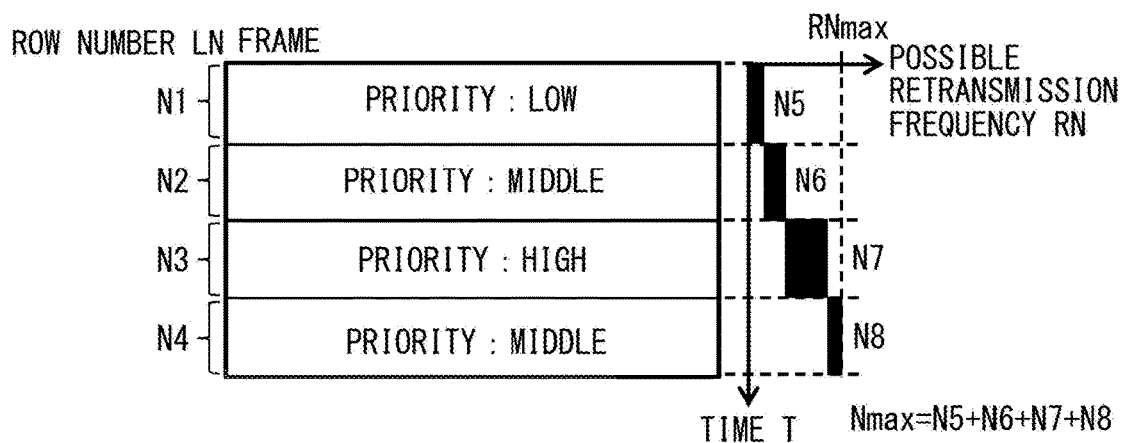
[FIG. 9]
| REGISTER | | |
|---|---|---|
| LN=N1 | | |
| RN=N5 | CA=Disble | |
| LN=N2 | | |
| RN=N6 | CA=Disble | M=Enable |
| LN=N3 | | |
| RN=N7 | CA=Enable | M=Enable |
| LN=N4 | | |
| RN=N8 | CA=Disble | M=Enable |

[FIG. 10]
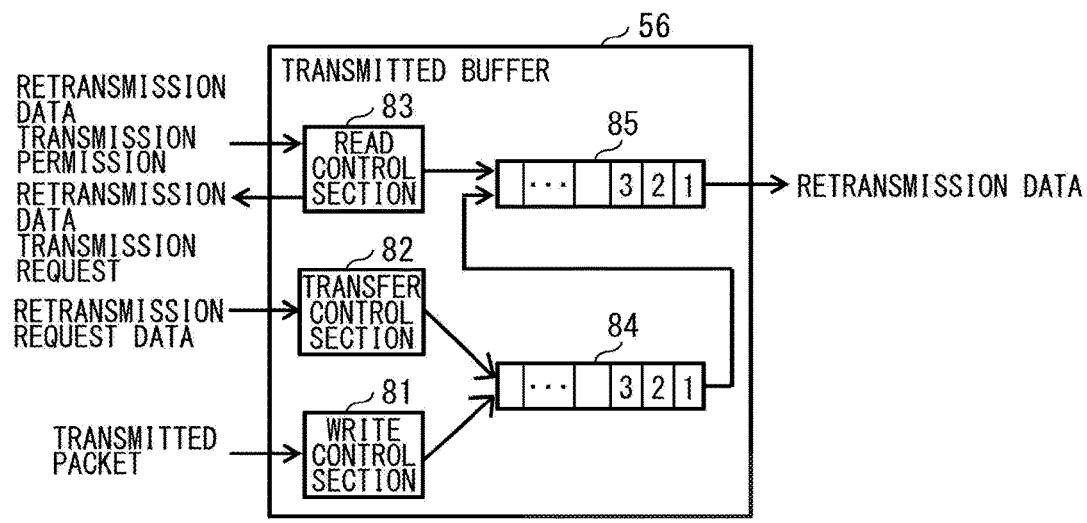
[FIG. 11]
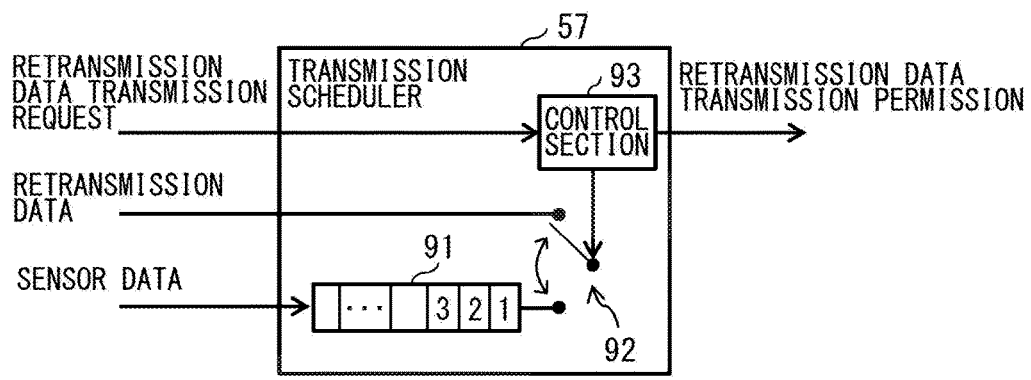

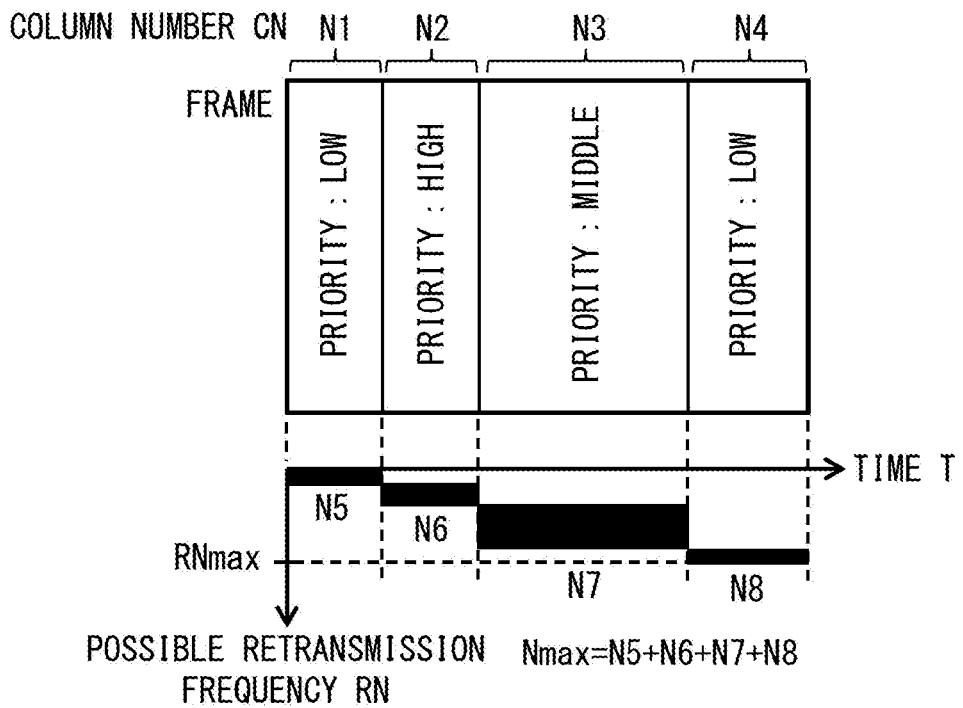

[FIG. 14]
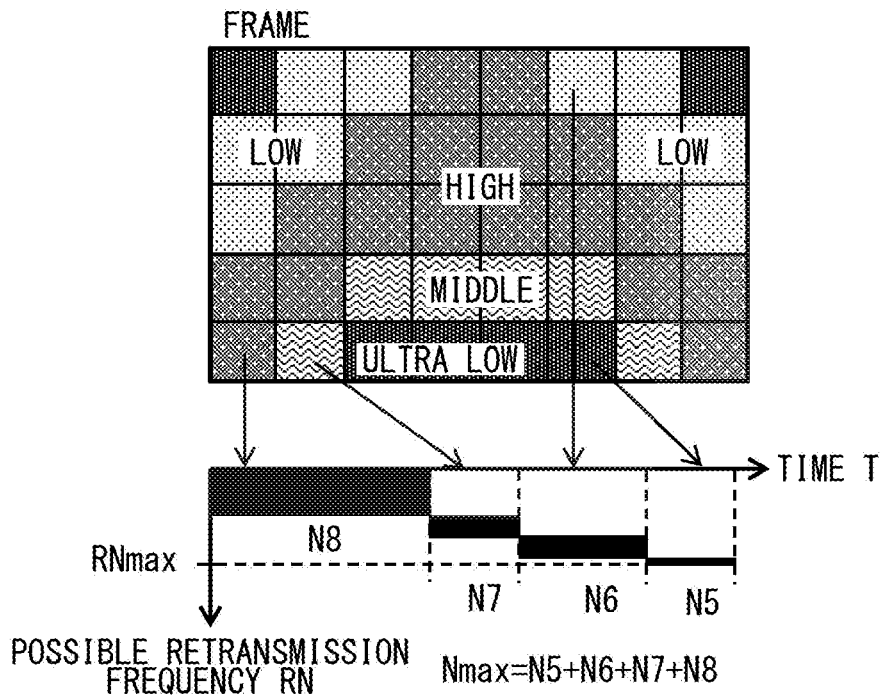
[FIG. 15]
| REGISTER | | |
|---|---|---|
| RN=N8 | CA=Enable | |
| RN=N7 | CA=Disble | M=Enable |
| RN=N6 | CA=Disble | M=Enable |
| RN=N5 | CA=Disble | M=Enable |
| COORDINATES OF RN=N8: (x1, y4), ⋯, (x8, y5) | | |
| COORDINATES OF RN=N7: (x2, y5), ⋯, (x7, y5) | | |
| COORDINATES OF RN=N6: (x1, y2), ⋯, (x8, y3) | | |
| COORDINATES OF RN=N5: (x1, y1), ⋯, (x6, y5) | | |

[FIG. 16]
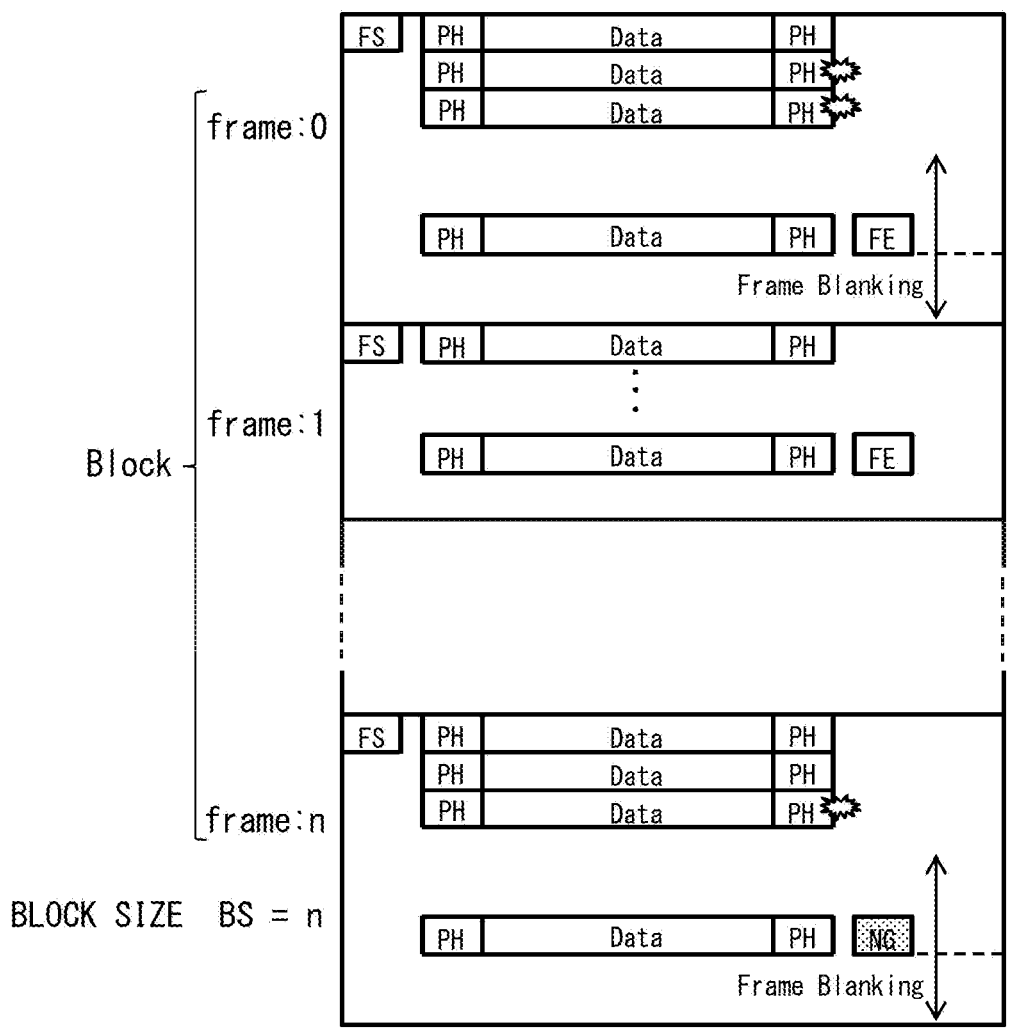

[FIG. 17]
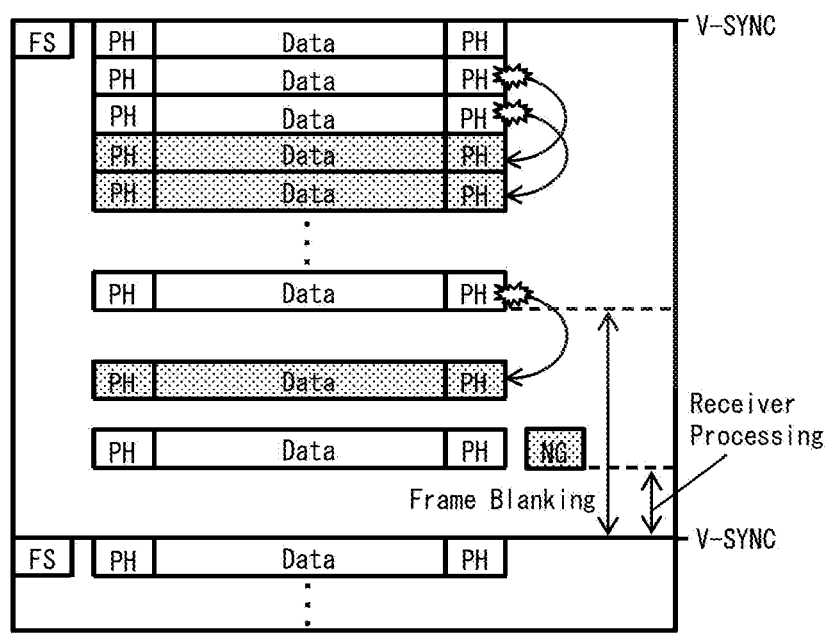

[FIG. 18]
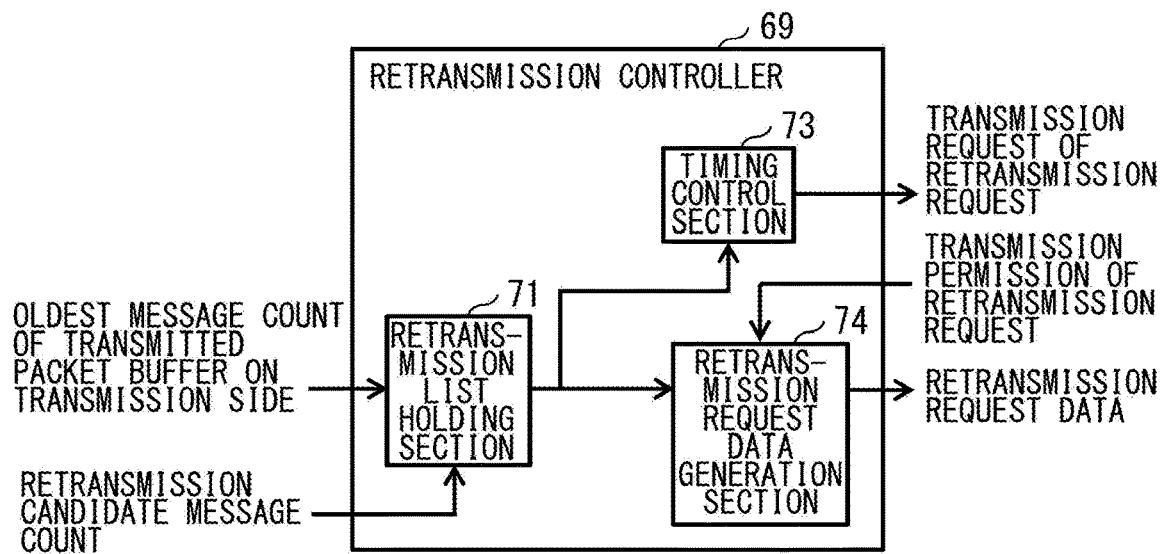
[FIG. 19]
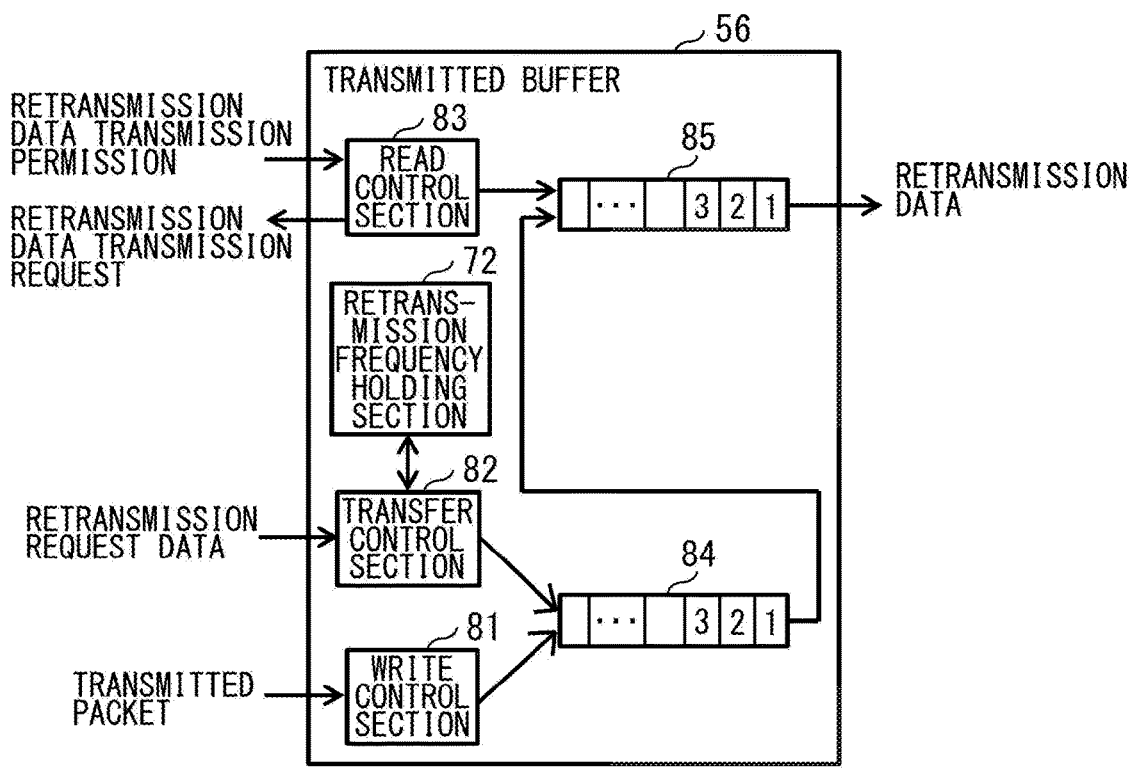

[FIG. 20]
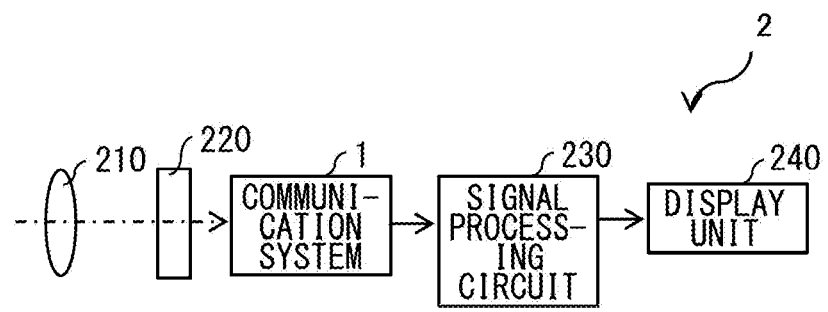

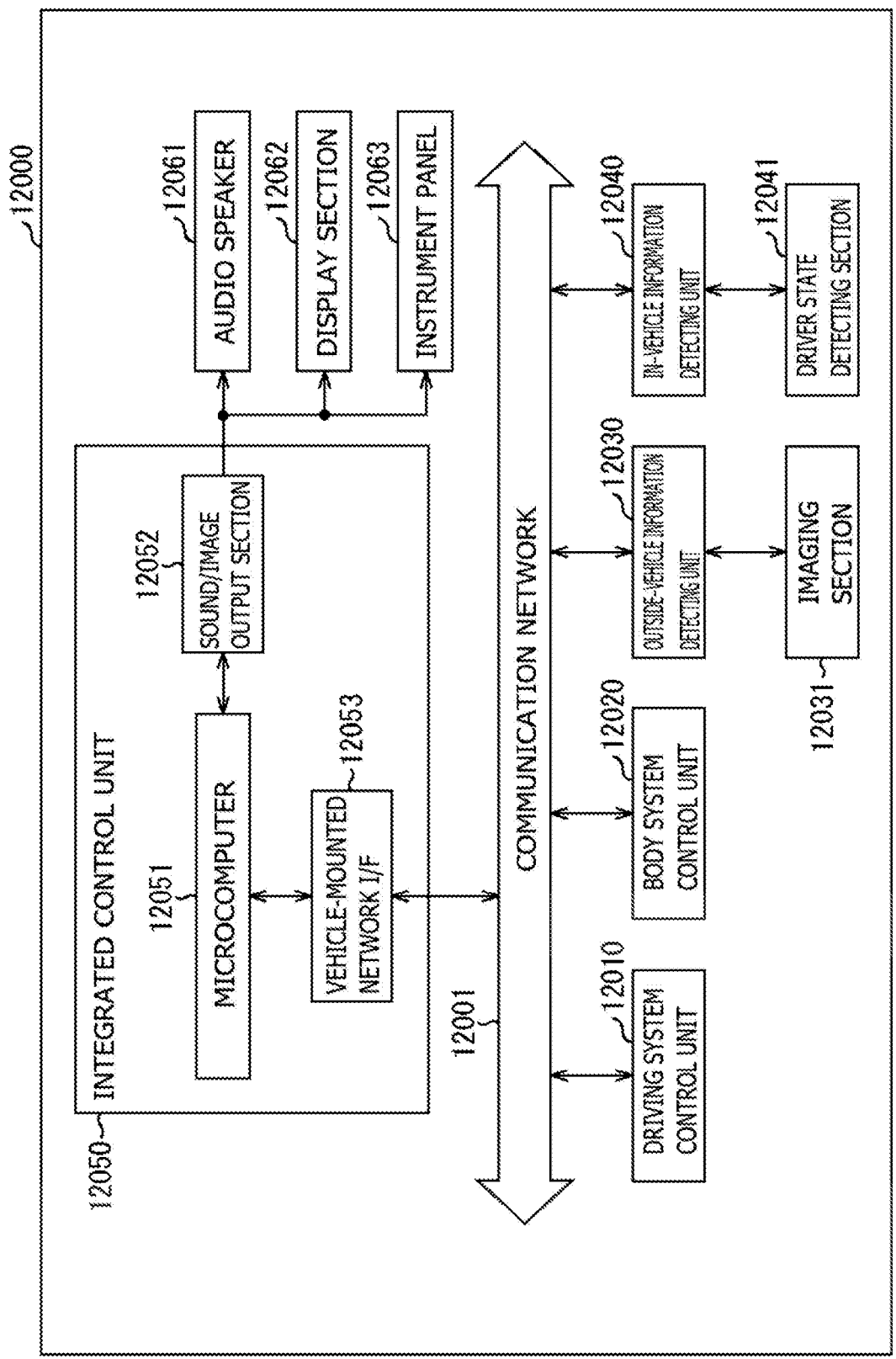
[FIG. 21]

[FIG. 22]
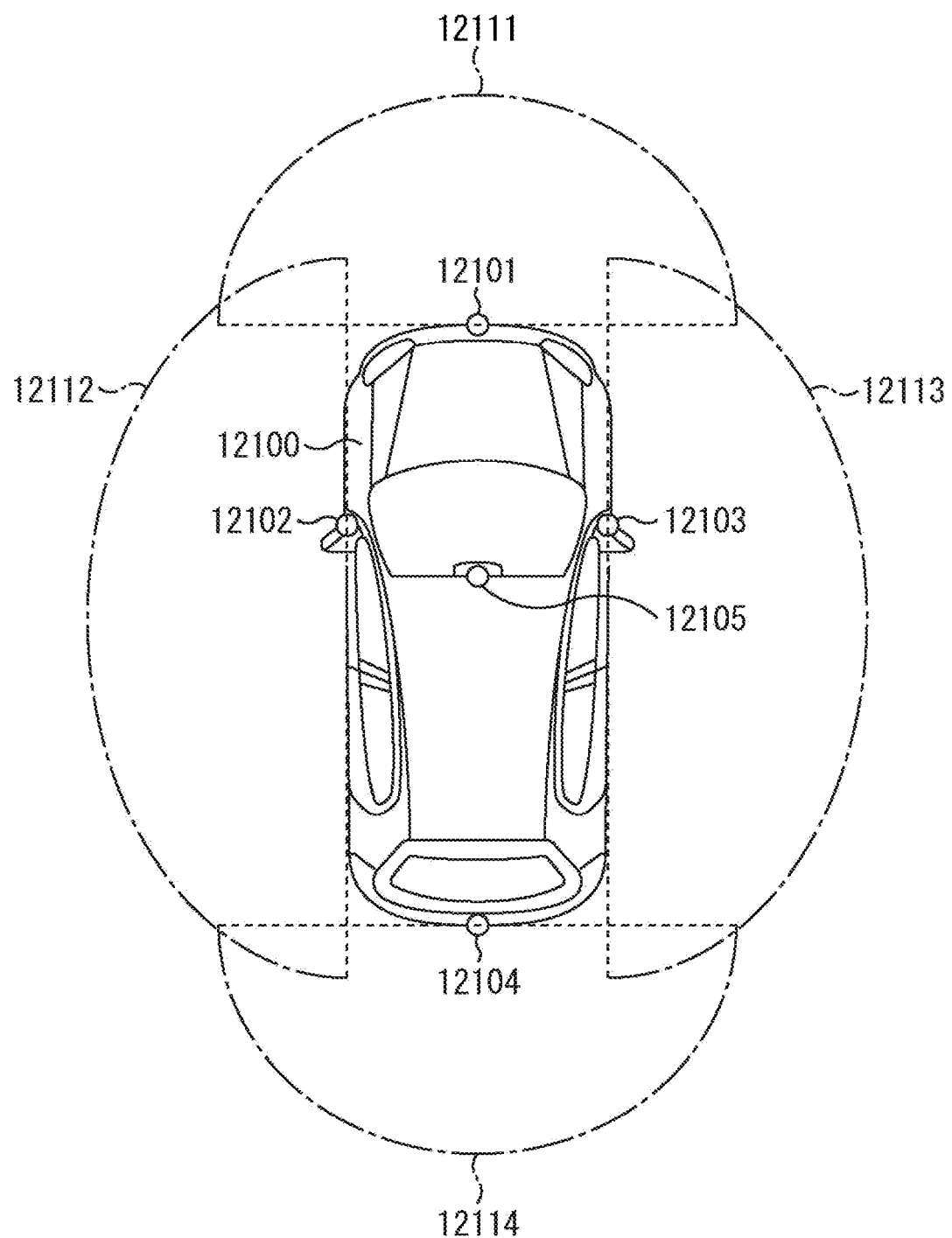

COMMUNICATION DEVICE AND COMMUNICATION SYSTEM FOR RETRANSMISSION CONTROL

CROSS REFERENCE TO RELATED APPLICATIONS

This application is a U.S. National Phase of International Patent Application No. PCT/JP2021/011204 filed on Mar. 18, 2021, which claims priority benefit of Japanese Patent Application No. JP 2020-056057 filed in the Japan Patent Office on Mar. 26, 2020. Each of the above-referenced applications is hereby incorporated herein by reference in its entirety.

TECHNICAL FIELD

The present disclosure relates to a communication device and a communication system.

BACKGROUND ART

In recent years, in order to achieve an automated vehicle driving technology, various sensors such as image sensors including a CIS (CMOS (Complementary Metal Oxide Semiconductor) Image Sensor), or a distance sensor utilizing TOF (Time of Flight) are mounted on a vehicle. In addition, it has been considered to utilize CIS (Camera Serial Interface)-2 standard for communication between these sensors and an application processor (AP: Application Processor).

In addition, PTL1 proposes a system that is able to reduce the number of data buses when coupling a processing device and multiple image sensors together by utilizing the CIS-2 standard.

CITATION LIST

Patent Literature

PTL 1: Japanese Unexamined Patent Application Publication No. 2017-211864

SUMMARY OF THE INVENTION

Incidentally, in a case where retransmission of sensor data frequently occurs due to deterioration in transmission path characteristics in communication between various sensors and an AP, there is a possibility that retransmission exceeding a transmission start timing of a next frame may occur. In such a case, there is a concern that a delay may spread to the next frame and thereafter, making it unable to maintain a desired frame rate. It is therefore desirable to provide a communication device and communication system that make it possible to maintain a desired frame rate.

A communication device according to a first aspect of the present disclosure includes: a determination section that determines propriety of a retransmission request on the basis of priority specified for each area within a frame in retransmission control; and a transmission section that generates retransmission request data, and makes transmission to another communication device, in a case where the retransmission request is permitted in the determination section.

In the communication device according to the first aspect of the present disclosure, propriety of a retransmission request is determined on the basis of priority specified for each area within a frame in retransmission control, and retransmission request data is generated and transmitted to another communication device in a case where the retransmission request is permitted. This makes it possible to prevent a delay from spreading to the next frame and thereafter.

A communication device according to a second aspect of the present disclosure includes: a reception section that receives retransmission request data in retransmission control; a transmission section that transmits data to another communication device; a holding section that holds, as transmitted data, the data transmitted from the transmission section; and a control section that performs retransmission control of the transmitted data on the basis of the retransmission request data.

In the communication device according to the second aspect of the present disclosure, upon reception of retransmission request data in retransmission control, retransmission control of transmitted data held by a holding section is performed on the basis of the retransmission request data. This makes it possible to prevent a delay from spreading to the next frame and thereafter.

A communication device according to a third aspect of the present disclosure includes: a determination section that determines propriety of retransmission of a transmitted packet on the basis of priority specified for each area within a frame in retransmission control; and a transmission section that transmits the transmitted packet to another communication device in a case where the retransmission of the transmitted packet is permitted in the determination section.

In the communication device according to the third aspect of the present disclosure, propriety of retransmission of a transmitted packet is determined on the basis of priority specified for each area within a frame in retransmission control, and the transmitted packet is transmitted to another communication device in a case where the retransmission of the transmitted packet is permitted. This makes it possible to prevent a delay from spreading to the next frame and thereafter.

A communication system according to a fourth aspect of the present disclosure includes a transmission device and a reception device, and the transmission device and the reception device communicate with each other. In this communication system, the reception device includes: a determination section that determines propriety of a retransmission request on the basis of priority specified for each area within a frame in retransmission control; and a first transmission section that generates retransmission request data, and makes transmission to the transmission device, in a case where the retransmission request is permitted in the determination section. In this communication system, the transmission device includes: a reception section that receives the retransmission request data; a second transmission section that transmits data to the reception device; a holding section that holds, as transmitted data, the data transmitted from the second transmission section; and a control section that performs retransmission control of the transmitted data on the basis of the retransmission request data.

In the communication system according to the fourth aspect of the present disclosure, propriety of a retransmission request is determined on the basis of priority specified for each area within a frame in retransmission control, and retransmission request data is generated and transmitted from a transmission device to a reception device in a case where the retransmission request is permitted. This makes it possible to prevent a delay from spreading to the next frame and thereafter.

A communication system according to a fifth aspect of the present disclosure includes a transmission device and a reception device, and the transmission device and the reception device communicate with each other. In this communication system, the reception device includes a first transmission section that generates retransmission request data, and makes transmission to the transmission device in retransmission control. In this communication system, the transmission device includes: a reception section that receives the retransmission request data; a second transmission section that transmits data to the reception device; a holding section that holds; as transmitted data; the data transmitted from the second transmission section; and a determination section that determines propriety of retransmission of the transmitted data on the basis of the retransmission request data and priority specified for each area within a frame. The second transmission section transmits the transmitted packet to the reception device in a case where retransmission of the transmitted packet is permitted in the determination section.

In the communication system according to the fifth aspect of the present disclosure, propriety of retransmission of transmitted packet is determined on the basis of priority specified for each area within a frame in retransmission control, and the transmitted packet is transmitted from a transmission device to a reception device in a case where the retransmission of the transmitted packet is permitted or not permitted. This makes it possible to prevent a delay from spreading to the next frame and thereafter.

BRIEF DESCRIPTION OF THE DRAWINGS

FIG. 1 illustrates a schematic configuration example of a communication system according to an embodiment of the present disclosure.

FIG. 2 illustrates an example of a frame format and a packet format to be used in a communication pursuant to an A-PHY standard in the communication system in FIG. 1.

FIG. 3 illustrates an example of functional blocks of communication devices in a sensor unit and a control unit.

FIG. 4 illustrates an example of a retransmission procedure at the time when an error occurs in the communication system in FIG. 1.

FIG. 5 illustrates an example of the retransmission procedure at the time when an errors occurs in the communication system in FIG. 1.

FIG. 6 illustrates an example of the retransmission procedure at the time when an errors occurs in the communication system in FIG. 1.

FIG. 7 illustrates a functional block example of a retransmission controller in FIG. 3.

FIG. 8 illustrates a functional block example of a transmitted buffer in FIG. 3.

FIG. 9 illustrates a functional block example of a transmission scheduler in FIG. 3.

FIG. 10 illustrates an example of priority in retransmission within one frame.

FIG. 11 illustrates an example of settings of a register.

FIG. 12 illustrates an example of priority in retransmission within one frame.

FIG. 13 illustrates an example of settings of the register.

FIG. 14 illustrates an example of priority in retransmission within one frame.

FIG. 15 illustrates an example of settings of the register.

FIG. 16 illustrates an example of retransmission control in the communication system in FIG. 1.

FIG. 17 illustrates an example of the retransmission control in the communication system in FIG. 1.

FIG. 18 illustrates a modification example of the functional block of the retransmission controller in FIG. 3.

FIG. 19 illustrates a modification example of the functional block of the transmitted buffer in FIG. 3.

FIG. 20 illustrates an example of a schematic configuration of an imaging system.

FIG. 21 is a block diagram depicting an example of schematic configuration of a vehicle control system.

FIG. 22 is a diagram of assistance in explaining an example of installation positions of an outside-vehicle information detecting section and an imaging section.

MODES FOR CARRYING OUT THE INVENTION

Hereinafter, description is given in detail of modes for carrying out the present disclosure with reference to the drawings. The following description is given of specific examples of the present disclosure, and the present disclosure is not limited to the following embodiments.

<Configuration Example of Communication System>

FIG. 1 illustrates a schematic configuration example of a communication system 1 according to an embodiment of the present disclosure. The communication system 1 is mounted on a vehicle such as an automobile, for example, and includes a sensor unit 10 and a control unit 20. The sensor unit 10 and the control unit 20 are coupled to each other via a bus 30. A-PHY, which is standard of a physical layer developed by MIPI (Mobile Industry Processor Interface) alliance, is used for signal transmission between the sensor unit 10 and the control unit 20 via the bus 30. The A-PHY is assumed to correspond to a transmission distance of up to 15 m, for example.

The sensor unit 10 includes, for example, an image sensor 11 (CIS) and a communication device 12. The image sensor 11 is coupled to the communication device 12 via a bus pursuant to an I3C standard. The control unit 20 includes, for example, a communication device 21 and an application processor 22 (AP). The application processor 22 is coupled to the communication device 21 via a bus pursuant to the I3C standard. The communication device 12 and the communication device 21 communicate with each other pursuant to the A-PHY standard via the bus 30.

FIG. 2 illustrates an example of a frame format and a packet format to be used in the communication pursuant to the A-PHY standard in the communication system 1.

For example, in a frame format to transmit one frame of an image, for each line of the image, a packet storing data of the line is generated; or, for each data resulting from multiple division of the line, a packet storing the data is generated, between frame start (FS: Frame Start) indicating the start of a frame and frame end (FE: Frame End) indicating the end of the frame. In addition, for example, in a frame format to transmit one frame of an image, for every multiple pixels included in an image, a packet storing data of the multiple pixels is generated, between the frame start (FS) indicating the start of a frame and the frame end (FE) indicating the end of the frame.

In the packet format in the A-PHY, a packet header is disposed in the head, and a packet tail is disposed at the tail. Then, a payload storing data is disposed between the packet header and the packet tail. The packet tail includes, for example, PHY CRC-32. The packet header includes, for example, Adaptation Descriptor, Service Descriptor, Placement Descriptor, PHY2, Target Address, PHY3, Payload Length, and PHY Header CRC. The Adaptation Descriptor includes, for example, Adaptation Type Value. Examples of the Adaptation Type Value include I²C, I3C, GPIO, and the like.

Further, the packet header includes, for example, a message count (MC: Message Count) to discriminate a packet. As the message count, a transmission number is used that is incremented every time a packet is transmitted. The packet header includes, in addition to the message count, for example, various types of information required to apply the communication system 1 to a vehicle such as an automobile. The communication system 1 utilizes the message count included in the packet header to discriminate a packet individually, thereby achieving retransmission for each packet.

<Functional Blocks of Communication Devices 12 and 21>

FIG. 3 illustrates an example of functional blocks of the communication devices 12 and 21.

In the communication system 1, for example, the communication device 12 and the communication device 21 transmit and receive control data to and from each other via a low-speed and bidirectional control channel. In addition, in the communication system 1, the communication device 12 transmits, for example, sensor data such as an image to the communication device 21 via a high-speed and unidirectional data channel.

The communication device 12 includes, for example, a transmitter 51, a receiver 52, an error detection code calculator 53, an error detector 54, a control data discriminator 55, a transmitted buffer 56, a transmission scheduler 57, an error detection code calculator 58, and a transmitter 59. Each block disposed on an upper side of a broken line illustrated in the communication device 12 is used for processing of transmission and reception of control data, and each block disposed on a lower side of the broken line is used for processing of transmission of sensor data.

The communication device 21 includes, for example, a transmitter 61, a receiver 62, an error detection code calculator 63, an error detector 64, a transmission/reception scheduler 65, a receiver 66, an error detector 67, a retransmission detector 68, and a retransmission controller 69. Each block disposed on an upper side of a broken line illustrated in the communication device 21 is used for processing of transmission and reception of the control data, and each block disposed on a lower side of the broken line is used for processing of reception of the sensor data.

The transmitters 51 transmit control data supplied from the error detection code calculator 53 to the communication device 21 via the control channel. The receiver 52 receives the control data transmitted from the communication device 21 via the control channel, and supplies the received control data to the error detector 54. The error detection code calculator 53 calculates a parity bit or CRC (Cyclic Redundancy Check), for example, as an error detection code for the control data supplied via the control data discriminator 55. Then, the error detection code calculator 53 adds the calculated error detection code to the control data, and supplies it to the transmitter 51.

The error detector 54 detects whether or not an error has occurred in the control data by using the error detection code added to the control data supplied from the receiver 52. Then, in a case where no error has occurred in the control data, the error detector 54 supplies the control data as it is to the control data discriminator 55, in accordance with a result of the error detection in the control data. Meanwhile, in a case where an error has occurred in the control data, the error detector 54 notifies that an error has occurred in the control data and supplies the control data to the control data discriminator 55, in accordance with the result of the error detection in the control data.

For example, the control data discriminator 55 receives an input of the control data and outputs it from and to a control circuit (unillustrated) that controls the image sensor 11, and discriminates the control data transmitted from the communication device 21. That is, the control data discriminator 55 supplies the error detection code calculator 53 with the control data inputted from the control circuit, and outputs to the control circuit the control data supplied from the error detector 54; at that time, the control data discriminator 55 discriminates the control data. For example, in a case where retransmission request data described later is transmitted, as the control data supplied from the error detector 54, from the communication device 21, the control data discriminator 55 detects the retransmission request data, and supplies the detected retransmission request data to the transmitted buffer 56.

A transmission packet to be transmitted from the communication device 12 to the communication device 21 is supplied to the transmitted buffer 56 from the transmission scheduler 57. Then, the transmitted buffer 56 temporarily holds, as a transmitted packet (transmitted transmission data), the transmission packet (transmission data) supplied from the transmission scheduler 57. In addition, when the retransmission request data is supplied from the control data discriminator 55, the transmitted buffer 56 appropriately supplies, as a retransmission packet (retransmission data), a transmitted packet (transmitted transmission data) for which retransmission is requested by the retransmission request data, from among the held transmitted packets (transmitted transmission data), to the transmission scheduler 57. It is to be noted that sensor data stored in a payload of the transmission packet is hereinafter referred to also as transmission data appropriately. The sensor data stored in the payload of the retransmission packet is hereinafter referred to also as the retransmission data appropriately.

Sensor data is inputted to the transmission scheduler 57 from an imaging element (unillustrated) of the image sensor 11. Here, a packet storing, in a payload, sensor data newly inputted from the image sensor 11 to the transmission scheduler 57, i.e., a packet storing, in the payload, sensor data which is not the retransmission data is hereinafter referred to as a new packet appropriately. In addition, the transmission scheduler 57 exchanges retransmission data transmission request and retransmission data transmission permission with the transmitted buffer 56, as described later, and the retransmission packet is supplied from the transmitted buffer 56. Then, the transmission scheduler 57 adjusts respective transmission timings of the new packets or the retransmission packets, and sequentially supplies the packets, as transmission packets to be transmitted from the communication device 12 to the communication device 21, to the transmitted buffer 56 and the error detection code calculator 58.

The error detection code calculator 58 calculates a parity bit or CRC, for example, as a code for error detection in the transmission packet supplied from the transmission scheduler 57, adds the code for error detection to the packet, and supplies it to the transmitter 59. The transmitter 59 transmits the transmission packet supplied from the error detection code calculator 58 to the communication device 21 via the data channel.

The transmitter 61, the receiver 62, the error detection code calculator 63, and the error detector 64 are configured similarly to the transmitter 51, the receiver 52, the error detection code calculator 53, and the error detector 54, respectively.

For example, the transmission/reception scheduler 65 receives an input of the control data and outputs it from and to a control circuit (unillustrated) that controls the application processor 22, and manages a schedule of the control data to be transmitted and received to and from the communication device 12. That is, the transmission/reception scheduler 65 outputs the control data supplied from the error detector 64 to the control circuit, and supplies the control data inputted from the control circuit to the error detection code calculator 63 at a predetermined timing, for transmission to the communication device 12. Further, when the retransmission request data is supplied from the retransmission controller 69, the transmission/reception scheduler 65 supplies, as the control data, the retransmission request data to the error detection code calculator 63, for transmission to the communication device 12.

The receiver 66 receives the transmission packet transmitted from the communication device 12 via the data channel, and supplies the received transmission packet to the error detector 67.

The error detector 67 uses the error detection code added to the transmission packet supplied from the receiver 66 to detect whether or not an error has occurred in the transmission packet. Then, the error detector 67 uses the error detection code added to the transmission packet to detect whether or not an error has occurred in the transmission packet, and outputs the sensor data stored in the payload of the transmission packet to a processing circuit in a subsequent stage.

Further, the error detector 67 supplies the retransmission detector 68 with an error detection result indicating a result of detection of an error having occurred in the transmission packet. For example, in a case where a detection has been made that a header error or a payload error has occurred in the transmission packet received by the communication device 21, the error detector 67 supplies the retransmission detector 68 with an error detection result indicating that a header error or a payload error has been detected. In addition, the error detector 67 supplies the retransmission detector 68 with a message count included in an additional packet header of the transmission packet received by the communication device 21.

The retransmission detector 68 performs retransmission detection processing to detect a message count of the transmission packet which fails to be received by the communication device 21 and for which retransmission is required, on the basis of the error detection result and the message count supplied from the error detector 67. Then, the retransmission detector 68 detects the message count detected by the retransmission detection processing as a retransmission candidate message count which is a candidate to request the retransmission, and supplies the detected message count to the retransmission controller 69. It is to be noted that the retransmission detection processing to be performed by the retransmission detector 68 is described later.

On the basis of the retransmission candidate message count supplied from the retransmission detector 68 and various types of information transmitted from the communication device 12, the retransmission controller 69 performs retransmission request processing to generate the retransmission request data requesting transmission of the retransmission packet and to supply the generated retransmission request data to the transmission/reception scheduler 65. It is to be noted that the retransmission request processing to be performed by the retransmission detector 68 is described later.

Here, the communication system 1 embeds various types of information required for the retransmission controller 69 to perform the retransmission request processing, in a header of the transmission packet storing the sensor data in the payload, and transmits the embedded various types of information from the communication device 12 to the communication device 21. For example, the communication device 12 utilizes a user-defined region of the packet header specified by the CSI-2 to transmit the various types of information required for the retransmission controller 69 to perform the retransmission request processing and to supply the information to the retransmission controller 69 via the error detector 67.

In accordance with the above-described configurations of the communication device 12 and the communication device 21, utilizing the message count included in the packet header specified in the A-PHY allows for achievement of retransmission for each packet. That is, the communication device 12 and the communication device 21 perform retransmission control of MIPIA-PHY.

Next, schematic description is given, with reference to a flowchart illustrated in FIG. 4, of packet retransmission processing to be executed in the communication system 1. FIG. 4 illustrates a flowchart of the packet retransmission processing to be executed in the communication system 1.

In step S101, the retransmission detector 68 of the communication device 21 performs retransmission detection processing. For example, on the basis of the error detection result and the message count supplied from the error detector 67, the retransmission detector 68 detects a message count of the transmission packet which fails to be received by the communication device 21 and for which retransmission is required.

In step S102, the retransmission controller 69 of the communication device 21 performs the retransmission request processing. For example, the retransmission controller 69 creates a retransmission list that registers a message count of the packet for which retransmission is requested, while performing filtering by the oldest message count held by the transmitted buffer 56 from among retransmission candidate message counts supplied from the retransmission detector 68. This allows the retransmission list to register a newer message count than the oldest message count held by the transmitted buffer 56, among the retransmission candidate message counts. Then, the retransmission controller 69 determines propriety of a retransmission request on the basis of priority specified for each area within a frame, and generates the retransmission request data in a case where the retransmission request is permitted. Specifically, on the basis of priority specified for each area within the frame, a possible retransmission frequency specified for each area, and the number of retransmissions counted for each area, the retransmission controller 69 determines propriety of the retransmission request, and generates the retransmission request data in a case where the retransmission request is permitted.

In step S103, the control data discriminator 55 and the transmitted buffer 56 of the communication device 12 perform retransmission acceptance processing. For example, the control data discriminator 55 discriminates the retransmission request data generated by the retransmission controller 69 from among control data supplied from the error detector 54, and supplies a packet of the retransmission request to the transmitted buffer 56. Then, when using a message count specified by the retransmission request data to search for the transmitted packet being held, and acquires, as a search result, a transmitted packet for which retransmission is requested, the transmitted buffer 56 secures the transmitted packet as a retransmission packet. Meanwhile, in a case of failing to acquire, as a search result, the transmitted packet for which retransmission is requested, the transmitted buffer 56 discards the retransmission request data used for the search.

In step S104, the transmission scheduler 57 of the communication device 12 performs retransmission data transmission processing. For example, the transmission scheduler 57 adjusts timings of transmitting the retransmission packet secured by the transmitted buffer 56 and a new packet storing newly inputted sensor data in a payload, and transmits, as the transmission packet, the new packet or the retransmission packet appropriately.

As described above, it is possible for the communication system 1 to request retransmission for each transmission packet transmitted from the communication device 12 to the communication device 21 and to execute transmission of a retransmission packet for which retransmission has been requested.

<Processing Example of Retransmission Detection Processing>

Description is given, with reference to FIGS. 5 and 6, of the retransmission detection processing in the communication system 1. FIGS. 5 and 6 each illustrate an example of the retransmission detection processing at the time when a payload error has occurred in the communication pursuant to the A-PHY standard in the communication system 1. FIGS. 5 and 6 each illustrate the retransmission detection processing triggered by reception of a message count included in the header, and numbers (1 to 6) surrounded by rectangular frames illustrated in FIG. 6 indicate message counts. FIGS. 5 and 6 each illustrate a state in which payload errors have occurred in transmission packets of message counts 2, 3, and 5.

When receiving a transmission packet of the message count 2, the communication device 21 checks a header of the transmission packet to thereby acquire the message count 2 included in the header. At this time, in a case where a payload error has occurred in the transmitted packet, the communication device 21 performs predetermined error detection processing to thereby recognize that a payload error has occurred in the transmitted packet of the message count 2.

The communication device 21 determines propriety of a retransmission request on the basis of priority specified for each area within a frame, and generates retransmission request data in a case where the retransmission request is permitted. Specifically, on the basis of priority specified for each area within the frame, a possible retransmission frequency specified for each area, and the number of retransmissions counted for each area, the communication device 21 determines propriety of the retransmission request, and generates the retransmission request data in a case where the retransmission request is permitted. The communication device 21 transmits the generated retransmission request data to the communication device 12. When receiving the retransmission request data from the communication device 21, the communication device 12 secures, as a retransmission packet, transmitted packet corresponding to the message count 2 specified by the received retransmission request data. The communication device 12 transmits, as the transmission packet, the secured retransmission packet to the communication device 21 at a predetermined timing. Also when a payload error occurs in a transmission packet of the message count 3 or the message count 5, processing similar to that described above is performed. In addition, also in a case where a header error has occurred in the transmission packet, processing similar to that described above is performed.

<Configuration Example of Retransmission Controller 69 and Processing Example of Retransmission Request Processing>

Next, description is given of a configuration example of the retransmission controller 69 and a processing example of the retransmission request processing.

FIG. 7 illustrates a functional block example of the retransmission controller 69. The retransmission controller 69 includes, for example, a retransmission list holding section 71, a retransmission frequency holding section 72, a timing control section 73, and a retransmission request data generation section 74, as illustrated in FIG. 7.

Here, the retransmission controller 69 is supplied, for example, with various types of information transmitted while being embedded in the header of the transmission packet. Example of this information include information indicating the oldest message count of a transmitted packet buffer 84 (FIG. 10) of the transmitted buffer 56.

The retransmission list holding section 71 holds a retransmission list that registers a message count of a packet for which retransmission is requested, and manages the retransmission list. For example, the retransmission list holding section 71 manages the retransmission list to register only a newer message count than the oldest message count held by the transmitted buffer 56 among retransmission candidate message counts detected by the retransmission detector 68.

For example, when message counts 98 to 102 are registered in the retransmission list in accordance with the retransmission candidate message counts, it is assumed that the message count 100 is newly supplied as the oldest message count of the transmitted packet buffer 84 of the transmitted buffer 56. In this case, the retransmission list holding section 71 removes the message counts 98 and 99, which are older than the message count 100, from retransmission list to thereby cause only the message counts 100 to 102, which are newer than the message count 100, to be registered in the retransmission list.

The retransmission frequency holding section 72 includes a register (FIG. 9) in which data corresponding to the concept illustrated in FIG. 8 is stored. FIG. 8 exemplifies a state in which priority is set for each predetermined area within a frame (one image data). In the frame (one image data) in FIG. 8, priority is set for each predetermined row number from the top to the bottom. For example, priority "Low" is set for each line (first area) for a row of N1 from the top; priority "Middle" is set for each line (second area) for a row of N2 from the line where the priority "Low" is set; priority "High" is set for each line (third area) for a row of N3 from the line where the priority "Middle" is set; and priority "Middle" is set for each line (fourth area) for a row of N4 from the line where the priority "High" is set. As illustrated in FIG. 9, for example, in the register, a possible retransmission frequency RN corresponding to the priority is set to N5 for the first area; the possible retransmission frequency RN corresponding to the priority is set to N6 for the second area; the possible retransmission frequency RN corresponding to the priority is set to N7 for the third area; and the possible retransmission frequency RN corresponding to the priority is set to N8 for the fourth area. N5+N6+N7+N8 is equivalent to a possible retransmission frequency Nmax per frame (one image data).

From the viewpoint of the A-PHY standard, a packet is required to be sent to allow a logical layer not to exceed 97.5% of an effective transfer rate of the physical layer. Therefore, from the viewpoint of the A-PHY standard, the possible retransmission frequency Nmax is preferably set to a frequency that enables a packet to be sent within a range to allow the logical layer not to exceed 97.5% of the effective transfer rate of the physical layer.

In the register, various set values such as a row number LN, the possible retransmission frequency RN, an own area carry-over propriety flag CA, and a carry-over propriety flag M are specified for each area. In the register, set values for respective areas are recorded in order. For example, in the register, a set value for the first area, a set value for the second area, a set value for the third area, and a set value for the fourth area are recorded in this order.

Here, the row number LN is the number of pixel rows included in a relevant area. The possible retransmission frequency RN is the upper limit value of a frequency of a possible retransmission request in the relevant area. The own area carry-over propriety flag CA is a flag that, in a case where a frequency of the retransmission request (RNa) actually made in the relevant area is less than the possible retransmission frequency RN set in the register in the relevant area, sets whether or not to add a value of subtraction of RNa from RN (RN−RNa) to the possible retransmission frequency RN in the next area. The frequency (RNa) for each area of the retransmission request actually made is recorded in the register.

In a case where the own area carry-over propriety flag CA is "Disable", RN−RNa is not added to the possible retransmission frequency RN in the next area. In a case where the own area carry-over propriety flag CA is "Enable", RN−RNa is added to the possible retransmission frequency RN in the next area. In a case where RN−RNa is added to the possible retransmission frequency RN, the possible retransmission frequency RN in that area is the number greater, by RN−Rna, than the possible retransmission frequency RN set in the register.

The carry-over propriety flag M is a flag that sets whether or not a possible retransmission frequency (remaining frequency RNb) remaining unused is added to the possible retransmission frequency RN in the next area, regardless of whether or not RN−Rna in an area prior to the own area is added to the possible retransmission frequency RN of the own area. In a case where the carry-over propriety flag M is "Disable", the remaining frequency RNb is not added to the possible retransmission frequency RN in the next area. In a case where the carry-over propriety flag M is "Enable", the remaining frequency RNb is added to the possible retransmission frequency RN in the next area.

On the basis of the priority set for each area within the frame (one image data), the timing control section 73 performs control to retransmit, as the retransmission packet, a transmitted packet (hereinafter referred to as a "transmitted packet X") corresponding to a message count registered in the retransmission list of the retransmission list holding section 71. Specifically, on the basis of various settings set in the register for an area (hereinafter, referred to as an "area a") corresponding to the message count registered in the retransmission list of the retransmission list holding section 71 as well as the frequency of the retransmission request (RNa) actually made in the area a, the timing control section 73 determines whether or not to request the transmission/reception scheduler 65 to transmit a retransmission request that causes the transmitted packet X to be retransmitted as the retransmission packet.

In a case where the frequency of the retransmission request (RNa) actually made in the area a does not exceed the possible retransmission frequency RN set in the register for the area a, for example, the timing control section 73 determines that the transmission request for the retransmission request is permitted, and requests the transmission/reception scheduler 65 to transmit the retransmission request that causes the transmitted packet X to be retransmitted as the retransmission packet. However, on an occasion where the carry-over propriety flag M for the area a is set to "Enable" in the register, and in a case where the frequency of the retransmission request (RNa) actually made in the area a does not exceed a frequency of addition of the remaining frequency RNb to the possible retransmission frequency RN set in the register for the area a, for example, the timing control section 73 determines that the transmission request for the retransmission request is permitted, and requests the transmission/reception scheduler 65 to transmit the retransmission request that causes the transmitted packet X to be retransmitted as the retransmission packet. Further, in a case where the frequency of the retransmission request actually made within the frame (one image data) does not exceed the possible retransmission frequency Nmax specified for the frame (one image data), for example, the timing control section 73 determines that the transmission request for the retransmission request is permitted, and requests the transmission/reception scheduler 65 to transmit the retransmission request that causes the transmitted packet X to be retransmitted as the retransmission packet.

In a case where a transmission permission is obtained from the transmission/reception scheduler 65 for the transmission request issued by the timing control section 73, the retransmission request data generation section 74 generates a retransmission request data requesting retransmission of a transmitted packet corresponding to the message count read from the retransmission list of the retransmission list holding section 71, and supplies the generated retransmission request data to the transmission/reception scheduler 65.

<Configuration Example of Transmitted Buffer 56 and Processing Example of Retransmission Acceptance Processing>

Next, description is given of a configuration example of the transmitted buffer 56 and a processing example of the retransmission acceptance processing.

FIG. 10 illustrates a functional block example of the transmitted buffer 56. The transmitted buffer 56 includes, for example, a write control section 81, a transfer control section 82, a read control section 83, a transmitted packet buffer 84, and a retransmission packet buffer 85, as illustrated in FIG. 10.

The write control section 81 performs write control to write the transmitted packet supplied from the transmission scheduler 57 into the transmitted packet buffer 84.

The transfer control section 82 searches for a transmitted packet of a message count specified by the retransmission request data supplied from the control data discriminator 55, from among the transmitted packets held by the transmitted packet buffer 84. Then, in a case of being able to acquire, as a search result, the transmitted packet of the message count specified by the retransmission request data, the transfer control section 82 performs transfer control to transfer the transmitted packet to the retransmission packet buffer 85. It is to be noted that, in a case of not being able to acquire, as a search result, the transmitted packet of the message count specified by the retransmission request data, the transfer control section 82 discards the retransmission request data.

The read control section 83 manages an address of the retransmission packet held by the retransmission packet buffer 85, and issues a retransmission data transmission request requesting the transmission scheduler 57 to transmit the retransmission packet held by the retransmission packet buffer 85. Then, when the retransmission data transmission permission is obtained from the transmission scheduler 57, the read control section 83 performs read control to read the retransmission packet from the retransmission packet buffer 85 and supply the read retransmission packet to the transmission scheduler 57. The transmitted packet buffer 84 holds the transmitted packet, and the retransmission packet buffer 85 holds the retransmission packet.

<Configuration Example of Transmission Scheduler 57>

Next, description is given of a configuration example of the transmission scheduler 57.

FIG. 11 illustrates a functional block example of the transmission scheduler 57. The transmission scheduler 57 includes, for example, a sensor data buffer 91, a switching section 92, and a control section 93, as illustrated in FIG. 11.

The sensor data buffer 91 temporarily stores a new packet storing, in a payload, sensor data newly inputted from an imaging element (unillustrated) of the image sensor 11, for example. For example, the sensor data buffer 91 is required because it is assumed that the new packet storing sensor data in the payload is inputted during an output of the retransmission packet supplied from the transmitted buffer 56.

Under the control of the control section 93, the switching section 92 switches between the new packet stored in the sensor data buffer 91 and the retransmission packet supplied from the transmitted buffer 56, and outputs the packet from the transmission scheduler 57. When acquiring the retransmission data transmission request issued from the transmitted buffer 56, the control section 93 controls the switching of the output by the switching section 92. When acquiring the retransmission data transmission request issued from the transmitted buffer 56, for example, the control section 93 switches the output by the switching section 92 to side of the retransmission data.

Effects

Next, description is given of effects of the communication system 1 according to the present embodiment.

In the present embodiment, the propriety of the retransmission request is determined on the basis of priority specified for each area within the frame in the retransmission control, and, in a case where the retransmission request is permitted, the retransmission request data is generated and transmitted to another communication device. This makes it possible to prevent a delay from spreading to the next frame and thereafter. As a result, it is possible to maintain a desired frame rate.

In the present embodiment, in the register provided in the retransmission frequency holding section 72, a possible retransmission frequency corresponding to the priority is specified for each area within the frame. This allows the propriety of the retransmission request to be determined on the basis of the possible retransmission frequency specified for each area within the frame; in a case where the retransmission request is permitted, the retransmission request data is generated and transmitted to another communication device. This makes it possible to prevent a delay from spreading to the next frame and thereafter. As a result, it is possible to maintain a desired frame rate.

In the present embodiment, in a case where the frequency of the retransmission requested actually made in each area does not exceed the possible retransmission frequency, determination is made that the retransmission request is permitted. This makes it possible to prevent a delay from spreading to the next frame and thereafter. As a result, it is possible to maintain a desired frame rate.

In the present embodiment, an area is set for each predetermined row number in the frame. Here, for example, it is assumed that the image sensor 11 is provided in a mobile body such as an automobile and that image data is obtained by imaging of the front of the mobile body by the image sensor 11. At this time, there is a possibility that: a lower region in the image data may reflect a hood of the automobile; a middle region in the image data may reflect a road ahead of the automobile; and an upper region in the image data may reflect a sky ahead of the automobile. In this case, the importance of the middle region in the image data is higher than the importance of other regions, and thus setting an area within the frame for each predetermined row number in the frame makes it possible to secure retransmission of a region of high importance in the image data while maintaining a desired frame rate.

MODIFICATION EXAMPLES

Modification Example A

In the foregoing embodiment, the priority is set for each predetermined row number from the top to the bottom within the frame (one image data). However, in the foregoing embodiment, for example, the priority may be set for each predetermined column number from the left to the right within the frame (one image data), as illustrated in FIG. 12. In this case, in a frame format to transmit one frame of an image, for each column of the image, a packet storing data of the column is generated; or, for each data resulting from multiple division of the column, a packet storing the data is generated, between the frame start (FS) indicating the start of a frame and the frame end (FE) indicating the end of the frame.

In the frame (one image data) in FIG. 12, priority is set for each predetermined column number from the left. For example, priority "Low" is set for each column (first area) for a column of N1 from the left; priority "High" is set for each column (second area) for a column of N2 from the column where the priority "Low" is set; priority "Middle" is set for each column (third area) for a column of N3 from the column where the priority "High" is set; and priority "Low" is set for each column (fourth area) for a column of N4 from the column where the priority "Middle" is set. For example, the possible retransmission frequency RN is set to N5 for the first area; the possible retransmission frequency RN is set to N6 for the second area; the possible retransmission frequency RN is set to N7 for the third area; and the possible retransmission frequency RN is set to N8 for the fourth area. N5+N6+N7+N8 is equivalent to the possible retransmission frequency Nmax per frame (one image data).

In the register, for example, various set values such as a column number CN, the possible retransmission frequency RN, the own area carry-over propriety flag CA, and the carry-over propriety flag M are specified for each area, as illustrated in FIG. 13. In the register, set values for respective areas are recorded in order. For example, in the register, a set value for the first area, a set value for the second area, a set value for the third area, and a set value for the fourth area are recorded in this order. The column number CN is the number of pixel columns included in a relevant area.

In the present modification example, an area is set for each predetermined column number in a frame. Here, for example, it is assumed that the image sensor 11 is provided in a mobile body such as an automobile and that image data is obtained by imaging of the left front of the mobile body by the image sensor 11. At this time, there is a possibility that: a right end region in the image data may reflect a body and a pillar of the automobile; a middle region in the image data may reflect a road ahead of the automobile on the left; and a left end region in the image data may reflect a road shoulder or a guardrail of the road. In this case, the importance of the middle region in the image data is higher than the importance of other regions, and thus setting an area within the frame for each predetermined column number in the frame makes it possible to secure retransmission of a region of high importance in the image data while maintaining a desired frame rate.

Modification Example B

In the foregoing embodiment, the priority is set for each predetermined row number from the top to the bottom within the frame (one image data). However, in the foregoing embodiment, for example, the priority may be set for every predetermined multiple pixels in the frame (one image data), as illustrated in FIG. 14. In this case, in a frame format to transmit one frame of an image, for every multiple pixels included in the image, a packet storing data of the multiple pixels is generated, between the frame start (FS) indicating the start of a frame and the frame end (FE) indicating the end of the frame.

In the frame (one image data) in FIG. 14, priority is set for every predetermined multiple pixels. For example, priority "High" is set for an inverted V-shaped area (first area); priority "Middle" is set for an area (second area) adjacent to a lower portion of the area (first area) where the priority "High" is set; priority "Low" is set for each area (third area) adjacent to an upper right portion and an upper left portion of the area (first area) where the priority "High" is set; and priority "Ultra Low" is set for an area (fourth area) adjacent to an upper portion of each area (third area) where the priority "Low" is set and for an area (fourth area) adjacent to a lower portion of the area (second area) where the priority "Middle" is set. For example, the possible retransmission frequency RN is set to N8 for the first area; the possible retransmission frequency RN is set to N7 for the second area; the possible retransmission frequency RN is set to N6 for the third area; and the possible retransmission frequency RN is set to N5 for the fourth area. N5+N6+N7+N8 is equivalent to the possible retransmission frequency Nmax per frame (one image data).

In the register, for example, various set values such as the possible retransmission frequency RN, the own area carry-over propriety flag CA, and the carry-over propriety flag M are specified for each area, as illustrated in FIG. 15. In the register, set values for respective areas are recorded in order. For example, in the register, a set value for the first area, a set value for the second area, a set value for the third area, and a set value for the fourth area are recorded in this order. In the register, for example, coordinates to partition each area are further specified, as illustrated in FIG. 15.

In the present modification example, an area is set for every predetermined multiple pixels in the frame. Here, for example, it is assumed that the image sensor 11 is provided in a mobile body such as an automobile and that image data is obtained by imaging of the front of the mobile body by the image sensor 11. At this time, there is a possibility that: the inverted V-shaped region in the image data may reflect a road extending far and straight ahead of the automobile; the region adjacent to the lower portion of the inverted V-shaped region may reflect a hood of the automobile; and the region adjacent to the upper left portion and the upper right portion of the inverted V-shaped region in the image data may reflect a road shoulder or a guardrail. In this case, the importance of the inverted V-shaped region in the image data is higher than the importance of other regions, and thus setting an area within the frame for every predetermined multiple pixels in the frame makes it possible to secure retransmission of a region of high importance in the image data while maintaining a desired frame rate.

Modification Example C

In the foregoing embodiment and modification examples thereof, for example, not only the possible retransmission frequency Nmax per frame (one image data) but also a possible retransmission frequency for every multiple frames may be specified, as illustrated in FIG. 16. In this case, the concept of a block is introduced for every multiple frames, and the upper limit value of the retransmission frequency is specified for each block size BS. This makes it possible to prevent a delay from spreading to the next frame and thereafter. As a result, it is possible to maintain a desired frame rate.

Modification Example D

In the foregoing embodiment and modification examples thereof, for example, in a case where the frequency of the retransmission request (RNa) actually made in the relevant area exceeds the possible retransmission frequency RN set in the register in the relevant area, the retransmission controller 69 may transmit, to the transmission/reception scheduler 65, an error flag indicating that the RNa exceeds the possible retransmission frequency RN, as illustrated in FIGS. 16 and 17. In this case, when the error flag is supplied from the retransmission controller 69, the transmission/reception scheduler 65 supplies the error flag as control data to the error detection code calculator 63, for transmission to the communication device 12.

When the communication device 12 receives the error flag as the control data from the communication device 21, the control data discriminator 55 supplies the error flag to the transmitted buffer 56. When acquiring the error flag, the transmitted buffer 56 stops supplying the retransmission packet to the transmission scheduler 57. When receiving the error flag, the communication device 12 further adds, to the frame end, an NG flag indicating that retransmission is not permitted.

In this manner, in the present modification example, in a case where RNa exceeds the possible retransmission frequency RN, an error flag indicating that RNa exceeds the possible retransmission frequency RN is transmitted to the communication device 12. This allows transmission of the retransmission packet to be stopped, thus making it possible to prevent a delay from spreading to the next frame and thereafter. As a result, it is possible to maintain a desired frame rate.

Modification Example E

In the foregoing embodiment and modification examples thereof, for example, the retransmission frequency holding section 72 may be provided in the transmitted buffer 56 instead of being provided in the retransmission controller 69, as illustrated in FIGS. 18 and 19.

In this case, the timing control section 73 performs control to retransmit, as the retransmission packet, a transmitted packet (hereinafter referred to as the "transmitted packet X") corresponding to a message count registered in the retransmission list of the retransmission list holding section 71. Specifically, the timing control section 73 requests the transmission/reception scheduler 65 to transmit a retransmission request that causes the transmitted packet X to be retransmitted as the retransmission packet.

On the basis of the priority set for each area within the frame (one image data), the transfer control section 82 performs control to retransmit, as the retransmission packet, a transmitted packet (hereinafter referred to as the "transmitted packet X") corresponding to a message count specified by the retransmission request data supplied from the control data discriminator 55. Specifically, on the basis of various settings set in the register for an area (hereinafter, referred to as the "area a") corresponding to the message count specified by the retransmission request data supplied from the control data discriminator 55 as well as the frequency of the retransmission request (RNa) actually made in the area a, the transfer control section 82 determines whether or not to retransmit the transmitted packet X In a case where the frequency of the retransmission request (RNa) actually made in the area a does not exceed the possible retransmission frequency RN set in the register for the area a, for example, the transfer control section 82 determines that retransmission of the transmitted packet X is permitted, and performs transfer control to transfer the transmitted packet X to the retransmission packet buffer 85. However, on an occasion where the carry-over propriety flag M for the area a is set to "Enable" in the register, and in a case where the frequency of the retransmission request (RNa) actually made in the area a does not exceed a frequency of addition of the remaining frequency RNb to the possible retransmission frequency RN set in the register for the area a, for example, the transfer control section 82 determines that retransmission of the transmitted packet X is permitted, and performs transfer control to transfer the transmitted packet X to the retransmission packet buffer 85. Further, in a case where the frequency of the retransmission request actually made within the frame (one image data) does not exceed the possible retransmission frequency Nmax set for the frame (one image data), for example, the transfer control section 82 determines that retransmission of the transmitted packet X is permitted, and performs transfer control to transfer the transmitted packet X to the retransmission packet buffer 85.

In a case where the retransmission of the transmitted packet X is permitted, the transfer control section 82 searches for the transmitted packet X from among the transmitted packets held by the transmitted packet buffer 84. Then, in a case of being able to acquire the transmitted packet X as a search result, the transfer control section 82 performs transfer control to transfer the transmitted packet X to the retransmission packet buffer 85. It is to be noted that, in a case of not being able to acquire, as a search result, the transmitted packet of the message count specified by the retransmission request data, the transfer control section 82 discards the retransmission request data.

In the present modification example, the retransmission control using the retransmission frequency holding section 72 is performed in the communication device 12 (transmitted buffer 56). Also in such a case, it is possible to prevent a delay from spreading to the next frame and thereafter. As a result, it is possible to maintain a desired frame rate.

3. Application Example

FIG. 20 illustrates an example of a schematic configuration of an imaging system 2 including the communication system 1 according to any of the foregoing embodiment and modification examples thereof. The imaging system 2 includes, for example, an optical system 210, a shutter device 220, the communication system 1, a signal processing circuit 230, and a display unit 240.

The optical system 210 forms an image of image light (incident light) from a subject on an imaging surface of the communication system 1 (image sensor 11). The shutter device 220 is disposed between the optical system 210 and the imaging system 2, and controls periods of light irradiation and light blocking with respect to the communication system 1 (image sensor 11). The communication system 1 receives the image light (incident light) incident from the outside by the image sensor 11, and outputs a pixel signal corresponding to the received image light (incident light) to the signal processing circuit 230. The signal processing circuit 230 processes the pixel signal inputted from the communication system 1, and generates picture data. The signal processing circuit 230 further generates a picture signal corresponding to the generated picture data, and outputs the generated picture signal to the display unit 240. The display unit 240 displays a picture based on the picture signal inputted from the signal processing circuit 230.

In the present application example, the communication system 1 according to any of the foregoing embodiment and modification examples thereof is applied to the imaging system 2. This makes it possible to communicate appropriately in accordance with the capacity and speed of data to be transmitted, for example, thus making it possible to provide the imaging system 2 with high-quality captured images.

<Example of Practical Application>

The technology according to an embodiment of the present disclosure (present technology) is applicable to various products. For example, the technology according to an embodiment of the present disclosure may be achieved in the form of an apparatus to be mounted to a mobile body of any kind. Non-limiting examples of the mobile body may include an automobile, an electric vehicle, a hybrid electric vehicle, a motorcycle, a bicycle, any personal mobility device, an airplane, an unmanned aerial vehicle (drone), a vessel, and a robot.

FIG. 21 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 21, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 21, an audio speaker 12061, a display section 12062, and an instrument panel 12063 are illustrated as the output device. The display section 12062 may, for example, include at least one of an on-board display and a head-up display.

FIG. 22 is a diagram depicting an example of the installation position of the imaging section 12031.

In FIG. 22, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 22 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The description has been given hereinabove of one example of the mobile body control system, to which the technology according to an embodiment of the present disclosure may be applied. The technology according to an embodiment of the present disclosure may be applied to the imaging section 12031 among components of the configuration described above. Specifically, the imaging system 2 is applicable to the imaging section 12031. The application of the technology according to an embodiment of the present disclosure to the imaging section 12031 allows for a high-quality captured image, thus making it possible to perform highly accurate control utilizing the captured image in the mobile body control system.

Although the description has been given hereinabove of the present disclosure with reference to the embodiment, the modification examples, and the application example, the present disclosure is not limited to the foregoing embodiment, etc., and may be modified in a wide variety of ways. It is to be noted that the effects described herein are merely illustrative. The effects of the present disclosure are not limited to those described herein. The present disclosure may have other effects than those described herein.

In addition, the present disclosure may also have the following configurations.

(1)

A communication device including:

a determination section that determines propriety of a retransmission request on a basis of priority specified for each area within a frame in retransmission control; and a transmission section that generates retransmission request data, and makes transmission to another communication device, in a case where the retransmission request is permitted in the determination section.

(2)

The communication device according to (1), further including a register in which a possible retransmission frequency corresponding to the priority is set for each area.

(3)

The communication device according to (2), in which the determination section determines that the retransmission request is permitted in a case where a frequency of the retransmission request actually made in each area does not exceed the possible retransmission frequency.

(4)

The communication device according to (2), in which the determination section determines that the retransmission request is permitted in a case where a frequency of the retransmission request actually made within the frame does not exceed the possible retransmission frequency specified for the frame.

(5)

The communication device according to any one of (1) to (4), in which the area is set for each predetermined row number in the frame.

(6)

The communication device according to any one of (1) to (4), in which the area is set for each predetermined column number in the frame.

(7)

The communication device according to any one of (1) to (4), in which the area is set for every predetermined multiple pixels in the frame.

(8)

The communication device according to any one of (1) to (7), in which the communication device performs retransmission control of MIPIA-PHY.

(9)
A communication device including:
a reception section that receives retransmission request data in retransmission control;
a transmission section that transmits data to another communication device;
a holding section that holds, as transmitted data, the data transmitted from the transmission section; and
a control section that performs retransmission control of the transmitted data on a basis of the retransmission request data.

(10)
A communication device including:
a determination section that determines propriety of retransmission of a transmitted packet on a basis of priority specified for each area within a frame in retransmission control; and
a transmission section that transmits the transmitted packet to another communication device in a case where the retransmission of the transmitted packet is permitted in the determination section.

(11)
The communication device according to (10), in which the determination section determines that the retransmission of the transmitted packet is permitted in a case where a frequency of a retransmission request for each area actually made does not exceed a possible retransmission frequency specified for each area.

(12)
The communication device according to (10) or (11), in which the determination section determines that the retransmission of the transmitted packet is permitted in a case where a frequency of a retransmission request actually made within the frame does not exceed a possible retransmission frequency specified for the frame.

(13)
A communication system including:
a transmission device; and
a reception device, the transmission device and the reception device communicating with each other,
the reception device including
a determination section that determines propriety of a retransmission request on a basis of priority specified for each area within a frame in retransmission control, and
a first transmission section that generates retransmission request data, and makes transmission to the transmission device, in a case where the retransmission request is permitted in the determination section, and
the transmission device including
a reception section that receives the retransmission request data,
a second transmission section that transmits data to the reception device,
a holding section that holds, as transmitted data, the data transmitted from the second transmission section, and
a control section that performs retransmission control of the transmitted data on a basis of the retransmission request data.

(14)
A communication system including:
a transmission device; and
a reception device, the transmission device and the reception device communicating with each other,
the reception device including
a first transmission section that generates retransmission request data, and makes transmission to the transmission device in retransmission control, and
the transmission device including
a reception section that receives the retransmission request data,
a second transmission section that transmits data to the reception device,
a holding section that holds, as transmitted data, the data transmitted from the second transmission section, and
a determination section that determines propriety of retransmission of the transmitted data on a basis of the retransmission request data and priority specified for each area within a frame, in which
the second transmission section transmits the transmitted packet to the reception device in a case where retransmission of the transmitted packet is permitted in the determination section.

According to the communication device of a first aspect of the present disclosure, propriety of a retransmission request is determined on the basis of priority specified for each area within a frame in retransmission control, and retransmission request data is generated and transmitted to another communication device in a case where the retransmission request is permitted, thus making it possible to prevent a delay from spreading to the next frame and thereafter. As a result, it is possible to maintain a desired frame rate.

According to a communication device of a second aspect of the present disclosure, upon reception of retransmission request data in retransmission control, retransmission control of transmitted data held by a holding section is performed on the basis of the retransmission request data, thus making it possible to prevent a delay from spreading to the next frame and thereafter. As a result, it is possible to maintain a desired frame rate.

According to a communication device of a third aspect of the present disclosure, propriety of retransmission of a transmitted packet is determined on the basis of priority specified for each area within a frame in retransmission control, and the transmitted packet is transmitted to another communication device in a case where the retransmission of the transmitted packet is permitted, thus making it possible to prevent a delay from spreading to the next frame and thereafter. As a result, it is possible to maintain a desired frame rate.

According to a communication system of a fourth aspect of the present disclosure, propriety of a retransmission request is determined on the basis of priority specified for each area within a frame in retransmission control, and retransmission request data is generated and transmitted from a transmission device to a reception device in a case where the retransmission request is permitted, thus making it possible to prevent a delay from spreading to the next frame and thereafter. As a result, it is possible to maintain a desired frame rate.

According to a communication system of a fifth aspect of the present disclosure, propriety of retransmission of transmitted packet is determined on the basis of priority specified for each area within a frame in retransmission control, and the transmitted packet is transmitted from a transmission device to a reception device in a case where the retransmission of the transmitted packet is permitted or not permitted, thus making it possible to prevent a delay from spreading to the next frame and thereafter. As a result, it is possible to maintain a desired frame rate.

This application claims the benefit of Japanese Priority Patent Application JP2020-056057 filed with the Japan Patent Office on Mar. 26, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A first communication device, comprising:
circuitry configured to:
determine propriety of a retransmission request based on a basis of priority specified for each area within a frame in retransmission control;
generate retransmission request data in a case where the retransmission request is permitted; and
transmit the generated retransmission request data to a second communication device, in the case where the retransmission request is permitted.

2. The first communication device according to claim 1, further comprising a register in which a specific retransmission frequency corresponding to the priority is set for each area within the frame.

3. The first communication device according to claim 2, wherein
the circuitry is further configured to determine that the retransmission request is permitted based on a frequency of the retransmission request made in each area within the frame, and
the frequency of the retransmission request_does not exceed the specific retransmission frequency.

4. The first communication device according to claim 2, wherein
the circuitry is further configured to determine that the retransmission request is permitted based on in a case where a frequency of the retransmission request made within the frame, and
the frequency of the retransmission request does not exceed the specific retransmission frequency specified for the frame.

5. The first communication device according to claim 1, wherein each area within the frame is set for each specific row number in the frame.

6. The first communication device according to claim 1, wherein each area within the frame is set for each specific column number in the frame.

7. The first communication device according to claim 1, wherein each area within the frame is set for every specific multiple pixels in the frame.

8. The first communication device according to claim 1, wherein the first communication device is configured to perform the retransmission control of MIPIA-PHY.

9. A first communication device, comprising:
circuitry configured to:
receive retransmission request data in retransmission control;
transmit data to a second another communication device;
hold the transmitted data;
determine propriety of retransmission of the transmitted data based on a priority specified for each area within a frame in the retransmission control;
control retransmission control of the transmitted data based on the retransmission request data; and
transmit the transmitted data to the second communication device in a case where the retransmission of the transmitted data is permitted.

10. A first communication device, comprising:
circuitry configured to:
determine propriety of retransmission of a transmitted packet based on a basis of priority specified for each area within a frame in retransmission control; and
transmit the transmitted packet to a second another communication device in a case where the retransmission of the transmitted packet is permitted.

11. The first communication device according to claim 10, wherein
the circuitry is further configured to determine the retransmission of the transmitted packet is permitted based on a frequency of a retransmission request for each area within the frame; and
the frequency of the retransmission request does not exceed a specific retransmission frequency specified for each area within the frame.

12. The first_communication device according to claim 10, wherein
the circuitry is further configured to determine the retransmission of the transmitted packet is permitted based on a frequency of a retransmission request made within the frame; and
the frequency of the retransmission request does not exceed a specific retransmission frequency specified for the frame.

13. A communication system, comprising:
a first communication device; and
a second communication device, wherein
the first communication device and the second communication device are configured to communicate with each other;
the first communication device includes:
a first circuitry configured to:
determine propriety of a retransmission request based on a priority specified for each area within a frame in retransmission control;
generate a retransmission request data in a case where the retransmission request is permitted; and
transmit the retransmission request data to the second communication device,
in the case where the retransmission request is permitted; and
the second communication device includes:
a second circuitry configured to:
receive the retransmission request data;
transmit data to the first communication device;
hold the transmitted data; and
control retransmission of the transmitted data based on the retransmission request data.

14. A communication system, comprising:
a first communication device; and
a second communication device, wherein
the first communication device and the second communication device are configured to communicate communicating with each other;
the first communication reception device includes:
a first circuitry configured to:
generate retransmission request data; and
transmit the retransmission request data to the second communication device in retransmission control; and the second communication device includes:
a second circuitry configured to:
receive the retransmission request data;
transmit data to the first communication device;
hold the transmitted data;
determine propriety of retransmission of the transmitted data based on the retransmission request data and priority specified for each area within a frame; and
transmit the transmitted data to the first communication device in a case where retransmission of the transmitted data is permitted.

* * * * *